UNITED STATES PATENT OFFICE.

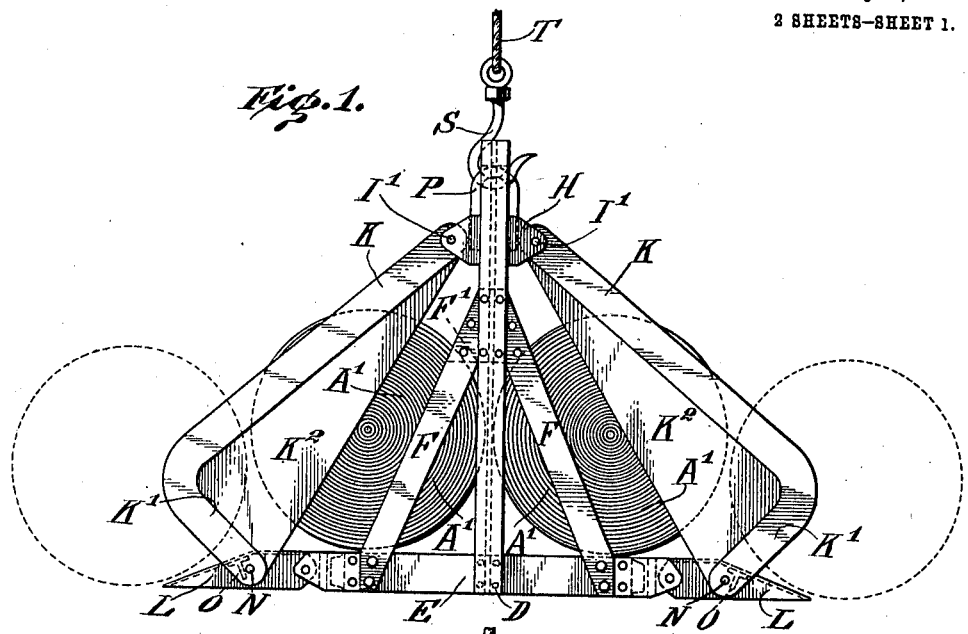
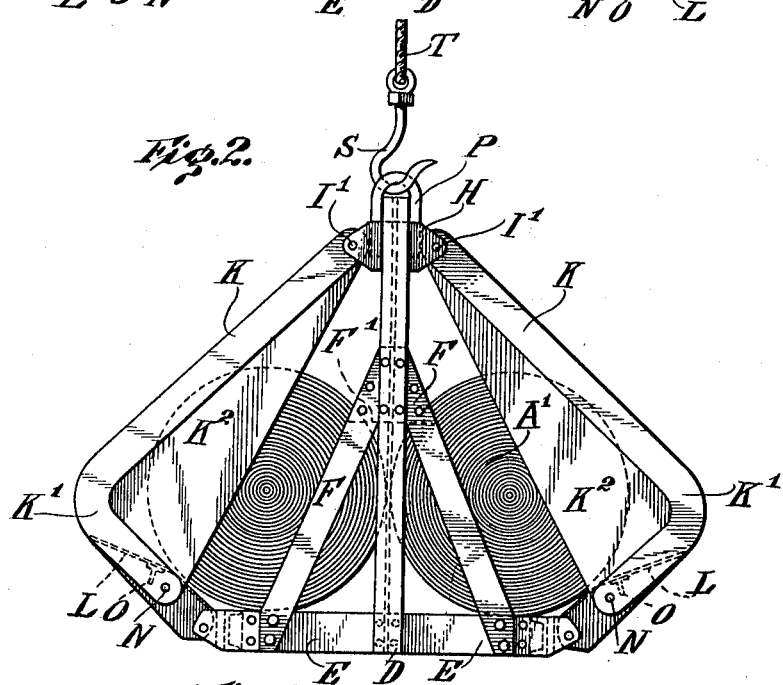

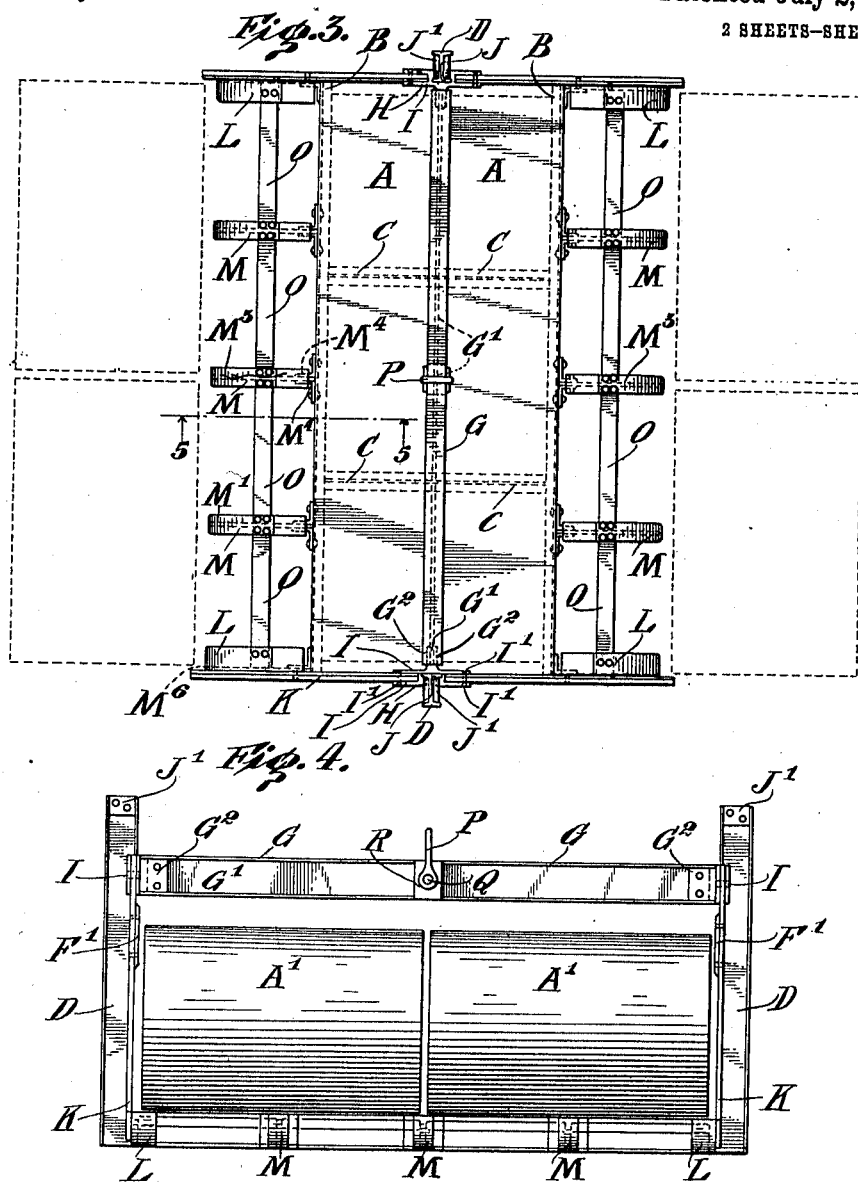

HERBERT S. ATKINSON, OF EAST ORANGE, NEW JERSEY, ASSIGNOR TO THE HAYWARD COMPANY, OF NEW YORK, N. Y., A CORPORATION OF NEW YORK.

SAFETY-SKIP.

1,031,412.  Specification of Letters Patent.  Patented July 2, 1912.

Application filed November 14, 1910. Serial No. 592,185.

*To all whom it may concern:*

Be it known that HERBERT S. ATKINSON, a citizen of the United States, and a resident of East Orange, in the county of Essex and State of New Jersey, has invented certain new and useful Improvements in Safety-Skips, of which the following is a full, clear, and exact specification, such as will enable others skilled in the art to which it appertains to make and use the same.

This invention relates to skips for unloading and loading freight and for other similar uses.

In the unloading of heavy freight from vessels, such, for example, as rolls of paper, which are usually of large size and great weight, the same is often damaged by abrasion due to coming forcibly in contact with the sides of the hatchway or other parts of the vessel, and such damage frequently results in much waste and loss. In addition to this damage, there is also danger, in unloading heavy freight, of its slipping from the holding means—which is usually a chain or rope passed around the article—and injuring, or endangering the lives of the freight handlers.

The object of this invention is to provide a safety skip which will not only protect the freight from damage by abrasion but also protect the handlers of the freight from injury, and while the device shown herein is especially adapted to the handling of large rolls of paper, it is equally adapted to the handling of other articles and to numerous other uses not herein specifically referred to.

A further object of the invention is to provide such a device which will be capable of easy manipulation by the operators and, being constructed in large part of standard structural materials, is economical to manufacture.

The foregoing objects will be readily apparent from the following description in connection with the drawings forming a part hereof, in which—

Figure 1 is an end elevation of the device with certain parts in open or inoperative position; Fig. 2 is a similar view with the parts referred to closed and in operative position; Fig. 3 is a plan view; Fig. 4 is a side elevation; Fig. 5 is an enlarged detail, partly in section and partly in elevation, taken on lines 5—5 of Fig. 3, in the direction of the arrows; and Fig. 6 is an enlarged detail plan view of some of the connecting parts at the corners of the device.

Referring to the construction illustrated, A represents the floor member of the device, which is preferably constructed of sheet metal suitably mounted upon longitudinally extending frame members B, B, which are shown as consisting of channel irons, and transverse supporting and bracing members C, C, which may be of any suitable form and secured in any desired manner to the longitudinal members B, B.

A′, A′ represent rolls of paper before and after being placed in position upon the device.

At each end of the apparatus there is provided a standard D, which is shown in the form of an I-iron, which is suitably secured at its lower end to a transverse frame member E. The standards D, D, serve not only as supports or framing members but also as guides for certain of the parts to be hereinafter referred to. Diagonal braces F, F, secured at one end to the transverse frame member E and at the other end to the standard D and plate F′ fastened thereto, serve to more effectually hold in place the several parts mentioned, and also act as end guards. It will be understood that there is a set of these diagonal braces at each end of the device.

Extending longitudinally at the upper portion of the apparatus, there is provided a supporting head G, preferably in the form of an I-beam, having at each end, and secured to its web G′ by means of the brackets $G^2$, a slide plate H of which the brackets $G^2$ form a part. The slide plates H are provided at each end with bearing lugs I, I, and, at their central portion, with a guideway J, whereby they are adapted to slide upon the inner flanges of the standard D, and carry the supporting head G. The extreme upward and downward movement of the plates H is limited, respectively, by a plate J′ secured to upper end of the standard D and by the upper edge of the plate F′.

At each end of the device, and pivotally held by the pins I′, I′, of the bearing lugs I, I, are diagonally disposed links K, K. Each of these links is substantially straight the greater portion of its length, but at its lower end is formed with a downwardly and inwardly extending portion K'. Each of these links K is further provided with a triangular shaped web $K^2$, which may be formed integral with the link K or formed separately and secured thereto in any desired manner. Preferably they should be considerably thinner than the link K, so as not to add unnecessary weight to the device, the purpose being more largely to guard and hold in place, at the ends of the apparatus, the articles to be moved.

At each side of the device are pivotally mounted side guards, comprising a series of guard arms, L, L, M, M, M, longitudinally connected together by one or more rows of cross-bars. The guard arms M, M, M, are preferably formed with a relatively wide flat upper surface horizontally disposed for about one half its length, indicated at M', and the remainder $M^2$ extending forwardly and downwardly at an incline thereto. The guard arms M, M, M, are formed centrally below their upper surface with a downwardly projecting relatively narrow web or rib $M^3$, one end of which is pivotally secured between the bearing lugs $M^4$ of two oppositely disposed angle irons by means of the pin $M^5$, the inner legs of said angle irons being riveted or otherwise secured to one of the longitudinal frame members B, as shown in Fig. 3. The guard arms L, L, are, in construction, similar to the guard arms M, M, M, except that each is formed with a rib $M^6$, at one side instead of at its central portion, and instead of being secured between the lugs of two angle irons, it is pivotally secured by a pin $M^7$ which passes through one leg of an angle iron $M^8$ (secured to the frame member B), through said rib $M^6$ and through a bearing lug $M^9$ secured to the frame member E. Each of the guard arms L is also pivotally connected, by means of the pin N, to the lower end of one of the links K. All of the guard arms L, M, are rigidly connected together by means of cross bars O, preferably in the form of T-beams. While only one row of such cross bars is shown, it is to be understood that there may be more than one such row, and, furthermore, that the spaces between said guard arms may be completely filled by relatively wide strips instead of there being one or more rows of cross bars only.

At the central portion of the supporting head G, there is provided a clevis or hook P, secured by a pin Q passing through plates R fastened at each side of the head G, and through the web G' of said head, to which clevis may be attached a tackle-hook S at the end of a hoisting rope T, which may be operated in any manner from any suitable source of power.

The operation will be quite clear from the following description: When the hoisting rope is slackened off and the skip ready for loading, the parts take the position shown in Fig. 1, the slide plate H and the head G being lowered by gravity, and the guard arms L and M, resting horizontally on the loading floor and the surface $M^2$ affording an easy incline for loading, which may be done from one or both sides of the apparatus. When the device is loaded, ready for hoisting, tension is put on the hoisting rope, the supporting head G rises, taking along the links K, which, in turn, carry upwardly the outer ends of the guard arms L and the outer ends of each of the intermediate guard arms M. In this position, as shown in Fig. 2, the rolls of paper are not only prevented from rolling or slipping from the skip but are also protected against damage. When the load is to be discharged, the hoisting rope is slackened and the part automatically assume again the position shown in Fig. 1, when the load can be easily and quickly discharged.

What is claimed is:

1. In a safety skip, the combination of a floor member, a movable supporting head, guide-standards between the supporting head and the floor member, movable side guards, and means for raising and lowering the side guards.

2. In a safety skip, the combination of a floor member, a movable supporting head, standards between the supporting head and the floor member, movable side guards and means connected to the supporting head and to said side guards for raising and lowering said side guards.

3. In a safety skip, the combination of a floor member, a plurality of standards connected to said floor member, a supporting head slidable on said standards, side guards pivotally connected to said floor member, and means for raising and lowering said side guards.

4. In a safety skip, the combination of a floor member, a plurality of standards, a supporting head slidable on said standards, side guards pivotally connected to said floor member, and pivoted means connecting said supporting head and said side guards to raise and lower the latter.

5. In a safety skip, the combination of a floor member, a supporting head, connections between the supporting head and the floor member, side guards and means for raising and lowering the latter, said side guards comprising a plurality of guard arms connected to said floor member and having inclined upper faces.

6. In a safety skip, the combination of a floor member, a supporting head, connections between the supporting head and the floor member, side guards and means for raising and lowering the latter, said side guards comprising a plurality of guard arms connected to said floor member and intermediate connecting members between said guard arms.

7. In a safety skip, the combination of a movable supporting head, a floor member, intermediate supporting members between the floor and head, side guards movably connected to said floor, and pivoted means connected to said side guards and to said head for actuating said guards from the movement of the head.

8. In a safety skip, the combination of a movable supporting head, a floor member, intermediate supporting members between the floor and the head, side guards movably connected to said floor, and pivoted means for actuating said side guards, said means comprising a plurality of links connected to the head and to said side guards, and having portions to act as end guards.

HERBERT S. ATKINSON.

Witnesses:
WALTER L. POST,
VIOLA IRVIN.

Copies of this patent may be obtained for five cents each, by addressing the "Commissioner of Patents, Washington, D. C."